(12) United States Patent
Tseng

(10) Patent No.: US 6,256,845 B1
(45) Date of Patent: Jul. 10, 2001

(54) CLOSABLE LOOP KEEPER STRAP

(76) Inventor: James J. Tseng, 251 Ashley Dr., Rochester, NY (US) 14620

( * ) Notice: Subject to any disclaimer, the term of this patent is extended or adjusted under 35 U.S.C. 154(b) by 0 days.

(21) Appl. No.: 09/383,893

(22) Filed: Aug. 26, 1999

(51) Int. Cl.$^7$ ............................. A44B 21/00; B65D 63/00; F16L 3/08
(52) U.S. Cl. ........................ 24/298; 24/3.13; 24/30.5 P; 24/16 R; 24/306
(58) Field of Search ..................................... 24/298, 16 R, 24/16 PB, 30.5 P, 17 B, 17 AP, 306, 3.13, 1, 2, 66.6, 66.9

(56) References Cited

U.S. PATENT DOCUMENTS

| | | |
|---|---|---|
| D. 361,504 | 8/1995 | Woller . |
| 0,666,960 * | 1/1901 | Fuller et al. ........................ 24/16 R |
| 1,042,875 * | 10/1912 | Bishop ................................. 24/3.13 |
| 1,490,066 | 4/1924 | Carr . |
| 3,501,774 * | 3/1970 | Norman ............................... 24/306 |
| 3,994,048 * | 11/1976 | Rosenthal ........................... 24/16 R |
| 4,982,885 | 1/1991 | Severson et al. . |
| 5,075,932 | 12/1991 | Hunt et al. . |
| 5,075,933 | 12/1991 | Kemper . |
| 5,104,076 * | 4/1992 | Goodall, Jr. ........................ 24/306 |
| 5,131,118 | 7/1992 | Breeher . |
| 5,271,127 * | 12/1993 | Christensen ....................... 24/16 R |
| 5,577,698 * | 11/1996 | Liu et al. ........................... 24/20.5 P |
| 5,881,436 * | 3/1999 | Lyons ................................. 24/16 R |
| 5,896,623 * | 4/1999 | Martin ................................ 24/3.13 |
| 5,901,416 * | 5/1999 | Mears ............................... 24/30.5 P |

* cited by examiner

Primary Examiner—Victor N. Sakran
(74) Attorney, Agent, or Firm—Eugene Stephens & Associates

(57) ABSTRACT

This invention relates to a closable loop keeper strap for securing, storing, and transporting household, garden, and industrial items. By forming a strap from an elongated length of material having a flexible, openable, and closable keeper at one end and a hanger element at the opposite end, one can produce an improved, low-cost, re-useable load-securing strap. By folding the end of the elongated length of material, having the flexible keeper attached thereto, around a load to be secured, a user can form an adjustable and releasable noose around the load. The adjustable and releasable noose is formed when the user wraps the flexible keeper around the unfolded portion of the length of material and fastens the keeper to form a closed keeper loop. The user can then slidably position the keeper loop along the length of the elongated length of material to tighten and loosen the noose. The closable loop keeper strap can accommodate loads of varying size, shape, and weight. By using such a strap, a user can conveniently secure and release a load without being burdened by time-consuming adjustments. Moreover, because this strap can be made from readily available elements, it can be manufactured and sold economically.

15 Claims, 5 Drawing Sheets

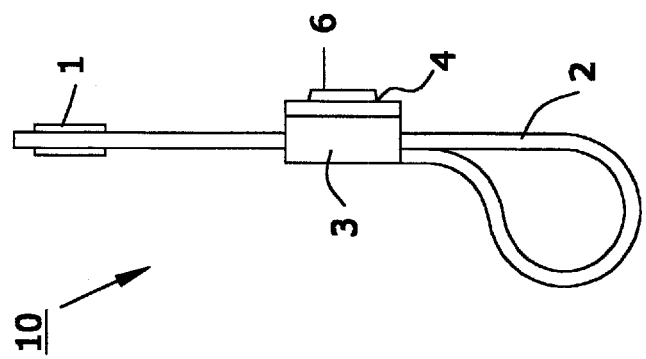
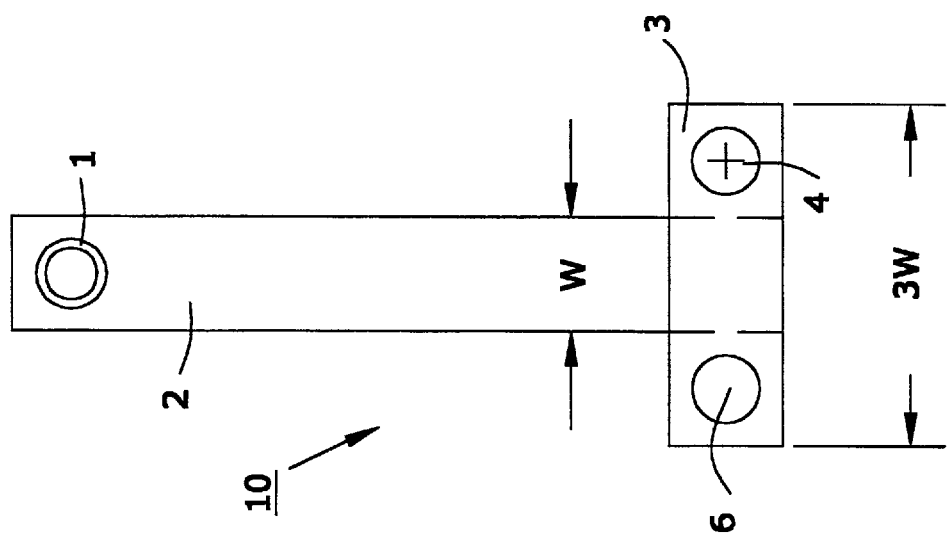

CLOSABLE LOOP KEEPER STRAP

TECHNICAL FIELD

Adjustable straps for securing, storing, and transporting loads.

BACKGROUND

Many homes and businesses are cluttered with household, garden, and industrial items including hoses, extension cords, ropes, cables, etc. Often, these items can be both cumbersome to transport and difficult to store. It is not uncommon, for instance, for one to find such items in a tangled mess in the corner of a garage, a tool shed, or a serviceman's truck.

Even when tightly coiled, transportation and storage can be problematic. Often, no matter how well these items are bound, they unwind and become tangled.

To prevent such items from tangling, many people use straps or ties. A strap can be any length of material that a user can wind around a coiled item and then tie to prevent the item from unwinding. Although there are various load-securing straps on the market, many of these straps suffer from various drawbacks. For instance, depending on the size of the load to be secured, the individual securing the load must cut or select a strap that is long enough to reach around the load. In addition, the individual must take time to secure the strap, making various knots, so that the strap remains tight around the load. Also, when the individual wants to use an item secured by such a strap, the individual must remove the knots in the strap to release the item. All these factors make existing straps inconvenient and inefficient for securing household, garden, and industrial items.

SUMMARY OF INVENTION

I have developed a re-useable, closable loop keeper strap for securing and storing household, garden, and industrial items. My strap includes features that make it a convenient, low-cost alternative to existing load-securing straps.

I can make my strap from a variety of materials. Moreover, I can make the strap in a single or two-piece construction. The strap includes a flexible length of material and an openable and closable flexible keeper attached to one end of the length of material. The keeper is formed so that a user can wrap the keeper around the flexible length of material to form a closed keeper loop. Once formed, the keeper loop can slide longitudinally along the length of material.

Although many configurations of the strap are possible, the strap functions the same regardless of the configuration chosen. First, a user places the load to be secured in contact with the flexible length of material. The user then folds the end of the length of material that includes the attached keeper around the load. By wrapping the keeper around the unfolded portion of the length of material, the user can create a closed keeper loop around the length of material to form an adjustable and releasable noose around the load. The user can then tighten the noose around the load. Moreover, if the strap and the load are appropriately lifted, the force of the load held within the noose tightens the noose around the load, securing the load within the strap. Once the load is secured, the strap can be hung, on a hook or nail, using a hanger element positioned at the end of the length of material opposite the end folded to form the noose.

My strap offers several advantages over conventional load securing straps. First, my strap offers enhanced versatility. The strap can be used to secure loads of varying size; no additional adjustments are required to make the strap accommodate an unusually large or small load. Second, the strap can easily handle relatively heavy loads since the fastener is designed to be isolated from the direct force of the load held by the strap. Also, my strap ensures that no matter how heavy or how large the load being held by it, the load will be held securely within the strap. Moreover, because of the strap's simple construction, a user can secure a load within the strap without having to use any application tools. Finally, the openable and closable keeper allows the user to easily release a secured load.

DRAWINGS

FIG. 1A is a schematic view of one embodiment of a closable loop strap with an attached keeper forming a "T".

FIG. 1B is a schematic view of one embodiment of the closable loop keeper strap arranged to form an adjustable and releasable noose.

DETAILED DESCRIPTION

Figure 2B:
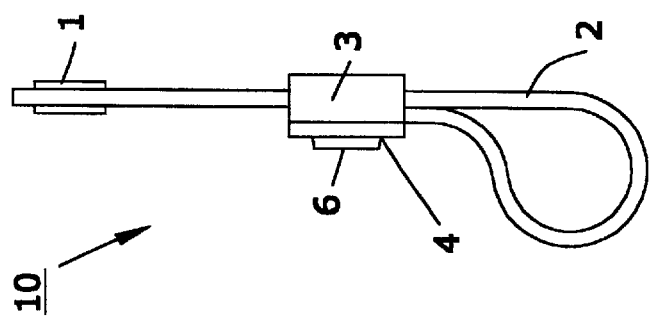
FIG. 2B is a schematic view of one embodiment of the closable loop keeper strap arranged to form an adjustable and releasable noose.

My closable loop keeper strap 10 includes an elongated flexible length of material 2 with a hanger element 1 positioned at one end and an attached keeper 3 with a fastener located at a second end of the length of material 2. The strap 10 can be made of various materials and in various configurations. Moreover, the hanger element 1 used to hang the strap 10 and the fastener used to secure the keeper 3 around the length of material 2 can include a wide variety of interchangeable elements.

The elongated length of material and the keeper can be made as separate elements that are later connected, or they can be made in a one-piece construction. If the length of material and the keeper are separate elements that are later attached to form the strap, the length of material and the keeper can be sewn together; or alternatively, they can be riveted, stapled, or otherwise fastened to avoid the time and expense of sewing. Although I can use many different materials to make my strap, I prefer to make the elongated length of material and the keeper of a material that is relatively flexible and relatively durable. Suitable materials can include durable fabrics, durable resins, leather, durable webbing, etc. Moreover, I can make the elongated length of material and the keeper either of different materials or of the same material.

One embodiment of my strap is shown in FIG. 1A. In this embodiment, the strap 10 includes an elongated length of material 2 with a keeper 3 positioned perpendicular to the end of the length of material 2, opposite the end including the hanger element 1, to form a "T". The keeper 3 includes a pair of mateable fastener elements 4 and 6 positioned at each extended end of the keeper 3 forming the "T". In operation, a user places a load (not shown) in contact with the elongated length of material 2. The user then folds the end of the length of material 2, including the attached keeper 3, so that the keeper 3 can be wrapped around the length of material at a region along the length of material 2 between the hanger element 1 and the load (not shown). Once wrapped around the flexible length of material 2, the user can mate the fasteners 4 and 6 on either end of the keeper 3 so that a closed keeper loop is formed. In the preferred embodiment, the keeper 3 wraps around the length of material 2 so that the closed keeper loop forms a tight fit around the length of material 2. Once the keeper loop is formed, an adjustable and releasable noose is formed around the load (see FIG. 1B). The user can then tighten the noose around the load by pulling the end of the length of material where the hanger element 1 is located so that the load is held securely within the strap 10. Because of the friction between the keeper 3 and the flexible length of material 2, the load remains secured within the noose. Alternatively, the user can lift the strap 10 by the end of the length of material 2 that includes the hanger element 1 so that the weight of the load held within the noose causes the noose to tighten around the load, thereby holding the load securely within the strap 10. The strap 10 and the load can then be hung from a nail or hook using the hanger element 1.

Although the hanger element 1 depicted in FIGS. 1A and 1B is a grommet, I can use any element that can support the weight of the strap 10 and the load. I have found the following elements to be suitable: a D-ring, a hook, a grommet, or an eyelet. Similarly, although FIGS. 1A and 1B depict the fastener as a pair of male and female snap fastener elements 4 and 6, other fasteners are equally suitable for securing the keeper 3 around the flexible length of material 2 to form the adjustable and releasable noose. Suitable fasteners include: snap fasteners, twist fasteners, hook and loop fasteners, buckle fasteners, and friction-fit fasteners.

Figure 2A:
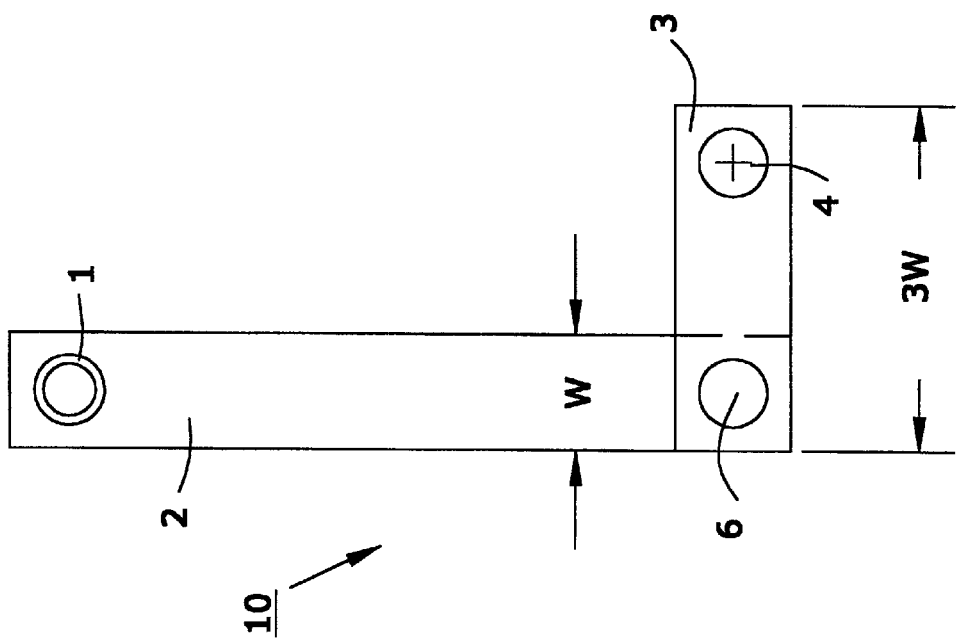
FIG. 2A is a schematic view of one embodiment of a closable loop strap with an attached keeper forming an "L".

A second configuration of my strap is depicted in FIG. 2A. In this embodiment, the strap 10 is comprised of an elongated length of material 2 having a hanger element 1 at one end and a keeper 3 positioned perpendicular to the opposite end so that the keeper 3 and the length of material 2 form an "L". Again, the keeper 3 is equipped with a male and female fastener element 4 and 6.

In operation, the strap 10 depicted in FIG. 2A functions almost identically to the strap depicted in FIG. 1A. The user places a load (not shown) in contact with the elongated length of material 2. Next, the user folds the end of the length of material 2, with the attached keeper 3, around the load so that the keeper 3 can be wrapped around the length of material 2 at a region between the hanger element 1 and the load. The user then secures the keeper 3 around the length of material 2 so that an adjustable and releasable noose is formed around the load.

As with the embodiment depicted in FIGS. 1A and 1B, the user can then either manually tighten the noose around the load to secure the load within the strap 10 or the user can lift the load by the end of the length of material 2, where the hanger element 1 is located, so that the weight of the load within the noose causes the noose to tighten around the load. Once secured, the user can then hang the strap 10 and the load using the hanger element 1.

Figure 2C:
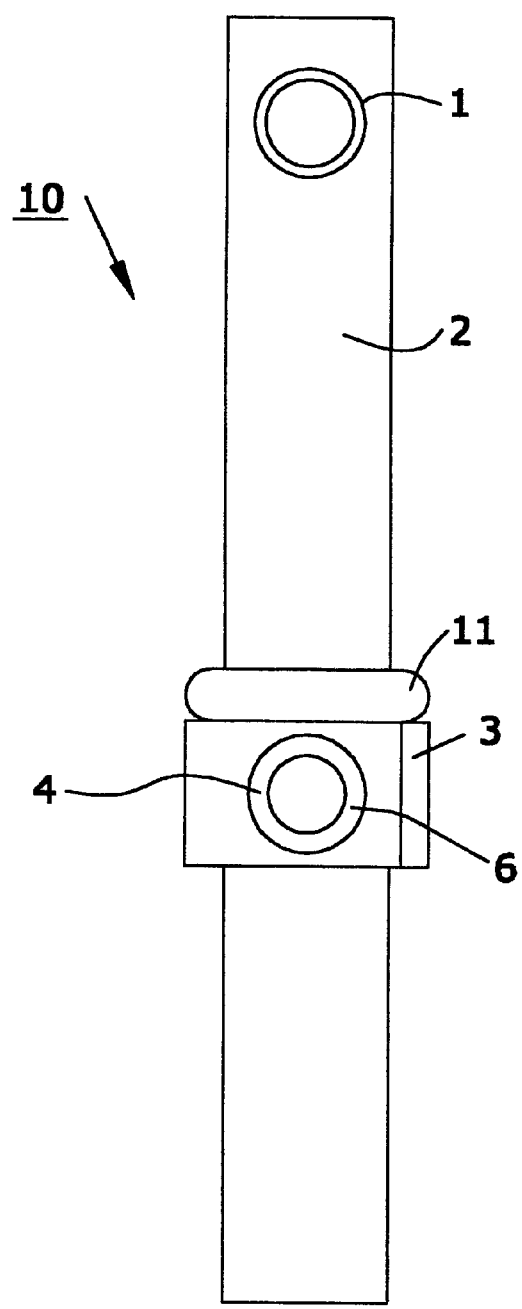
FIG. 2C is a schematic view of one embodiment of the closable loop keeper strap with a stopper element.

In either of the embodiments depicted in FIGS. 1A and 1B or 2A and 2B, it may be advantageous for the user to include a stopper element 11 (see FIG. 2C). The stopper element 11 is a member that the user can slidably position along the length of material 2. When necessary, the user can position the stopper element 11 to maintain the maximum size of the adjustable noose formed. Certain loads (e.g., plumber snakes, resilient wire, etc.) have a tendency to resist coiling. Loads of this type are often flexible or semi-rigid items that when coiled have a tendency to expand or return to their natural uncoiled state. When the user attempts to bind such items in an adjustable noose, the items uncoil and cause the noose to expand, making the noose loose enough so that the load can become free of the noose. By positioning the stopper element 11 at a point between the closed keeper loop and the hanger element 1, the user can effectively anchor the stopper 11 on the length of material 2 so that the keeper loop cannot be moved and the size of the noose formed cannot be expanded. In the preferred embodiment, the closed keeper loop is snugly fitted around the length of material 2 so that any movement of the keeper 3 is adequately obstructed by the stopper 11.

Figure 3A:
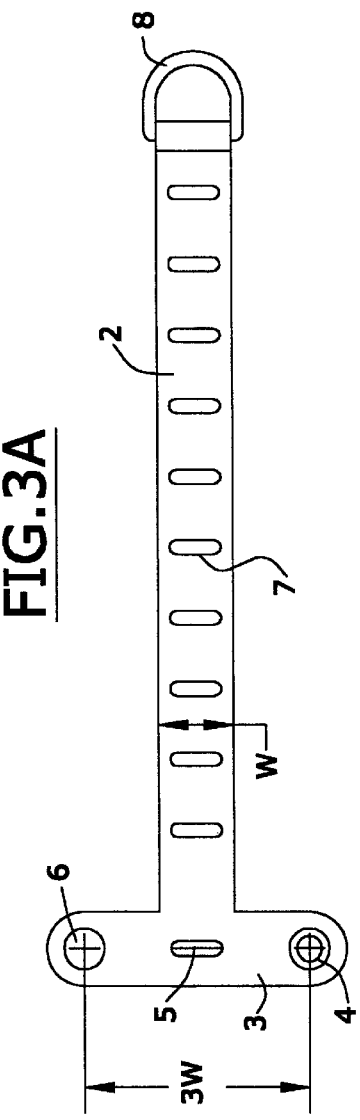
FIG. 3A is a top view of one embodiment of a closable loop keeper strap having a series of detents arranged along the length of the strap and a raised member positioned on the keeper to engage with a selected detent.
Figure 3B:
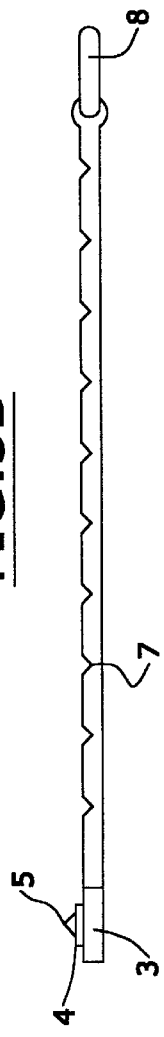
FIG. 3B is a side view of the strap having a series of detents and an elongated member.
Figure 3C:
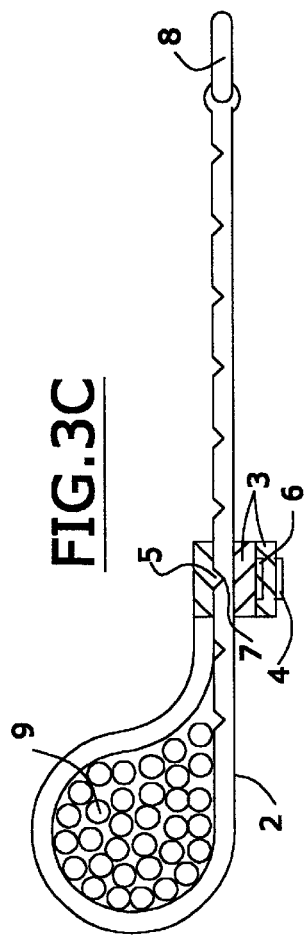
FIG. 3C is a side view of the strap forming an adjustable and releasable noose around a load with the raised member engaged with a selected detent.

A third embodiment of my strap is depicted in FIGS. 3A, 3B, and 3C. This embodiment includes an additional feature that is not included in the embodiments of FIGS. 1A, 1B, 2A, or 2B. In this embodiment, the strap 10 includes a series of detents 7 arranged lengthwise along the length of material 2. In addition, a raised member 5 is positioned upon the keeper 3. The raised member 5 is formed so that it can engage with any selected detent 7 in the series of detents 7 arranged along the length of material 2.

In operation, a user can secure a load using the third embodiment in the same way a load is secured using the embodiments described above. However, when using this embodiment, the user can engage the raised member 5 with a selected detent 7 once the noose has been formed around the load 9. By engaging the raised member 5 with a selected detent 7, the user can effectively maintain the maximum size of the noose formed around the load 9. The use of the raised member 5 and the series of detents 7 in the third embodiment is an alternative to using the stopper element 11 described above for maintaining the size of the adjustable noose formed. Again, the ability to maintain the maximum size of the noose formed can be especially beneficial when the load being secured is a load that tends to expand after being secured. In the absence of some means to maintain the size of the noose, the load 9 could expand and loosen the noose enough so that the load can become free of the noose.

Practically speaking, the formation of detents 7 along the length of material 2 in the third embodiment of the strap 10 requires that the length of material 2 be made from a resin, although there may be other materials that are suitable.

Also, because the third embodiment offers an effective way to maintain the size of the noose formed when a load is secured within the strap, the third embodiment serves as an attractive alternative to single-use cable ties. A cable tie consists of an elongated length of material that can wrap around a load to form a noose. A user can then manually tighten the noose around the load. Because the tie includes a receiver at one end and a series of raised obstructions along the length of the tie, the size of the noose formed around the load becomes fixed once the user has fully tightened the noose around the load. A problem with this design is that once secured within the noose, the load cannot be released from the tie without severing the tie. Unlike cable ties, the third embodiment of my strap is re-useable.

The keeper design is a significant feature of each embodiment of my strap. Not only is the keeper easy for a user to operate, but it also acts to isolate the fastener from the force of the load held within the strap. In effect, the keeper minimizes mechanical strain on the fastener, derived from the weight of a load held within the noose formed, by directing the force of the load in a direction that does not tend to open the fastener. By minimizing the force acting on the fastener, the keeper loop remains closed even when a user secures a relatively heavy load within the strap.

Figure 4:
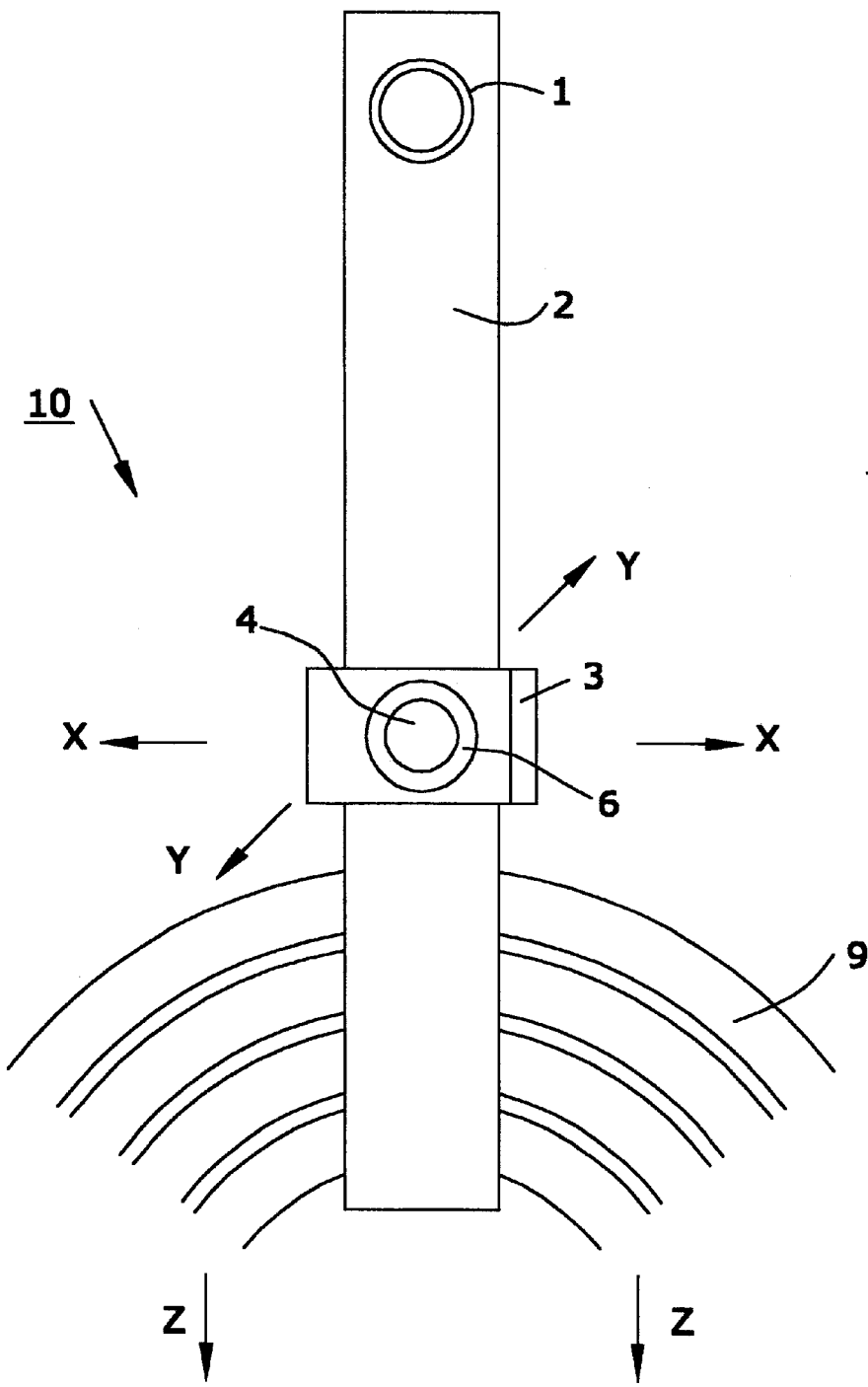
FIG. 4 is a schematic view of one embodiment of the strap with a load secured within it showing the forces acting upon the strap during operation.

For instance, when a user employs snap fasteners 4, 6 to secure the keeper 3 around the length of material 2, the majority of the force of the load 9 is directed in the X and Z planes (see FIG. 4). To open the fastener, an appropriate force must be applied in the Y plane. However, because of the keeper's configuration, only minimal force is directed in the Y plane. Because the magnitude of the force in the Y plane is limited, the fastener can withstand the force of the load held within the strap and the keeper can remain closed.

Also, to ensure that there is adequate friction between the keeper 3 and the length of material 2, I prefer to configure the dimensions of the keeper 3 and the length of material 2 so that the closed keeper loop fits snugly around the length of material 2. In the preferred embodiment, I configure the length of the keeper 3 to be approximately three times the width (W) of the length of material 2.

Regardless of its configuration, my re-useable, closable loop keeper strap provides an economical and efficient alternative to existing load-securing straps. My strap can accommodate loads of varying size and shape. Because of its simple construction, a user can secure a load within the strap without having to use any application tools. Moreover, by using my strap, a user can conveniently secure and release a load without being burdened by time-consuming adjustments. Finally, because my strap can be made from readily available elements, it can be manufactured and sold economically.

I claim:

1. A closable loop keeper strap configured as a flexible strap long enough to wrap around a load and form a load noose engaging and supporting the load, the flexible strap having a hanger at one end arranged for hanging up a noosed load, the keeper strap comprising:

a. a keeper at an end of the strap opposite the hanger;
   b. the keeper being formed of a flexible length of material long enough to wrap around the strap and overlap in a flexible keeper loop surrounding the strap;
   c. overlap regions of the keeper bearing a releasable fastener positioned to fasten together the overlap regions of the keeper to form the keeper loop wrapped around a region of the strap spaced from the hanger;
   d. the keeper loop being freely slideable along the strap to form the load noose wrapped around the load; and
   e. a weight of the load hung in the noose to depend from the hanger being sufficient to make the keeper loop slide down the strap away from the hanger to automatically tighten the load noose snuggly around the load independently of a girth of the load.

2. The keeper strap of claim 1, wherein the flexible strap and the keeper are made of different materials.

3. The keeper strap of claim 1, wherein the flexible strap and the keeper are made of the same material.

4. The keeper strap of claim 1, wherein the flexible strap and the keeper are made in a one-piece construction.

5. The keeper strap of claim 1, wherein the flexible strap and the keeper are two separate elements that are attached.

6. The keeper strap of claim 1, wherein the flexible strap and the keeper are made of a material that is a durable fabric, a durable resin, leather, or a durable webbing.

7. The keeper strap of claim 1, wherein the fastener is a twist fastener, a male and female snap, a hook and loop fastener, a buckle, or a friction-fit fastener.

8. The keeper strap of claim 1, wherein the keeper is perpendicular to the flexible strap so that the keeper and the flexible strap form a "T".

9. The keeper strap of claim 8, wherein the "T" includes a female fastener element at one extended portion of the keeper and a male fastener element at a second extended portion of the keeper so that when a user folds the first end of the length of material lengthwise and wraps the keeper around the length of material, the fastener elements can be mated, forming the keeper loop.

10. The keeper strap of claim 1, wherein the keeper is perpendicular to the flexible strap so that the keeper and the flexible strap form an "L".

11. The keeper strap of claim 10, wherein a first fastener element is positioned at an intersection of the keeper and the flexible strap, and a second mating fastener element is positioned at an opposite end of the keeper that extends away from the flexible strap to form the "L".

12. The keeper strap of claim 1, including a slidably adjustable stopper element that can be moved longitudinally along the flexible strap to limit the maximum size of the noose formed when a user secures the keeper around the flexible strap.

13. The keeper strap of claim 1, wherein a length of the keeper is approximately three times a width of the flexible strap.

14. The keeper strap of claim 1, wherein the hanger is a D-ring, a hook, an eyelet, or a grommet.

15. The keeper strap of claim 1, wherein the fastener is oriented so that weight of the load does not tend to release the fastener.

* * * * *